(12) United States Patent
Csik

(10) Patent No.: US 6,857,786 B2
(45) Date of Patent: Feb. 22, 2005

(54) CONSTANT VELOCITY JOINT INTEGRATED TO WHEEL BEARING AND TO AXIALLY ADJUSTABLE HUB

(76) Inventor: Frank Victor Csik, 421 Church Street, Beaconsfield Quebec (CA), H9W 3R7

( * ) Notice: Subject to any disclaimer, the term of this patent is extended or adjusted under 35 U.S.C. 154(b) by 0 days.

(21) Appl. No.: 10/222,888

(22) Filed: Aug. 19, 2002

(65) Prior Publication Data

US 2003/0026511 A1 Feb. 6, 2003

Related U.S. Application Data

(63) Continuation-in-part of application No. 09/774,570, filed on Feb. 1, 2001, now abandoned.
(60) Provisional application No. 60/179,032, filed on Feb. 1, 2000.

(51) Int. Cl.[7] .......................... F60C 13/00; F16D 3/94; B60K 17/30; B60B 27/00
(52) U.S. Cl. ...................... 384/589; 464/178; 180/254; 301/105.1
(58) Field of Search ................................ 384/544, 589; 464/178; 180/254, 256, 258; 301/105.1

(56) References Cited

U.S. PATENT DOCUMENTS

| | | | | |
|---|---|---|---|---|
| 747,895 A | * | 12/1903 | Schumacher | 384/589 |
| 3,589,747 A | * | 6/1971 | Asberg | 280/105 |
| 4,333,695 A | * | 6/1982 | Evans | 384/562 |
| 4,433,877 A | * | 2/1984 | Colanzi | 384/544 |
| 5,048,979 A | * | 9/1991 | Coates | 384/519 |
| 5,536,098 A | * | 7/1996 | Schwarzler | 403/259 |
| 5,607,241 A | * | 3/1997 | Fukumura | 384/537 |
| 6,146,022 A | * | 11/2000 | Sahashi et al. | 384/544 |
| 6,196,639 B1 | * | 3/2001 | Di Ponio et al. | 301/105.1 |

* cited by examiner

Primary Examiner—Xuan Lan Nguyen

(57) ABSTRACT

Mounted in a suspension upright for land vehicles, there is provided an arrangement comprising a constant velocity joint, a hub and two wheel bearings with provision for preload adjustment, wherein the CV joint's outer race proper is the inboard wheel bearing's inner race. The bearing raceway formed on the exterior surface of the CV joint's outer race proper is located so as to be in the general area occupied by the driven plane in line with the CV joint's flexural center, providing full end support to the CV joint itself, and concurrently bring about increased axial spacing between the inboard and outboard bearings. Having the CV joint's outer race proper thus integrated to the inboard wheel bearing, a robust hub assembly is provided, wherein the CV joint's flexural center can be placed more closely to the wheel center plane than is normally possible, making negative scrub radius with low kingpin inclination easily achievable.

1 Claim, 9 Drawing Sheets

CONSTANT VELOCITY JOINT INTEGRATED TO WHEEL BEARING AND TO AXIALLY ADJUSTABLE HUB

The present application is a continuation-in-part of provisional application Ser. No. 60/179,032 filed Feb. 1, 2000 and is a continuation-in-part of application Ser. No. 09/774,570 filed Feb. 1, 2001 now abandoned.

FIELD OF THE INVENTION

The present invention relates to improvements in the method of supporting the constant velocity joint outer race proper at the wheel end of an axle-driving shaft in a hub assembly of an independent type suspension layout for a wheeled vehicle and further, discloses more than one method devised for preload adjustment of wheel bearings in such an assembly.

In the following description of both the prior art and this invention, the term "constant velocity joint outer race proper" is intended to be limiting to the extent that it shall denote only the generally bell shaped part of the outer race which contains the ball grooves for transmitting driving torque from the inner race of the joint, which inner race is non-rotatably connected to the drive axle shaft. The term "constant velocity joint's outer race proper" shall specifically exclude that section of the outer race that is the stub axle, that axle being a reduced diameter integral appendage to the outer race. Further, the term "driven plane" refers the plane being normal to the outer race's rotational axis and is lined up with the flexural center of the constant velocity joint. The term "flexural center" refers to the point which lies at the intersection of the joint's driving and driven axes, otherwise know as joint center. The terms "inboard" and "outboard" refer to the ends of the hub assembly being closer to and farther from the vehicle's longitudinal center plane respectively.

BACKGROUND TO THE INVENTION

It is known in the art that the typical method of packaging the hub in the front upright with the constant velocity "CV" joint in the case of independently suspended wheels presents a compromised steering geometry in front-wheel-drive "FWD" and all-wheel-drive vehicles, which is especially pronounced in the case of light trucks and Sport Utility Vehicles. Three key parameters are essential to achieving an ideal FWD steering geometry, the first being low kingpin inclination angle for minimizing camber loss as steer lock is added, the second being negative scrub radius in order to minimize drive torque and brake reaction induced steering force variations, and the third parameter being short hub length owing to the fact that the wheel center, the dished disc, may not protrude outboard of the tire side wall, so as to prevent any damage to the hub which could otherwise be incurred in the course of normal use. To wit, a negative scrub radius exists when the kingpin intersects the ground level outboard of the wheel rim's center plane.

According to current practice for independent suspension layouts in general, the wheel bearing of choice for driven wheels—whether steered or not—is either the double row angular contact ball bearing, or a double row tapered roller bearing, or a pair of opposed angular contact ball bearings. Within the scope of independent type suspension layouts, accepted wheel hub packaging practice does not make it feasible to achieve negative scrub radius with low kingpin angle, especially not on SUVs and light trucks, as any currently practiced approach to wheel bearing packaging solutions force the wheel end—or outboard—CV joint undesirably far inboard of the wheel rim's center plane.

Another undesirable byproduct of current state of the art CV joint packaging practice is that said CV joint's said outer race proper is cantilevered by virtue of the bearing, or bearings, being substantially positioned on the integral stub axle, which stub axle axially extends in a generally lateral outwardly direction from said CV joint's said outer race proper. With regards to steering geometry, it is a given that the kingpin must simultaneously pass through the centers of both outboard suspension joints and the CV joint. Consequently, according to the known state of the art, if near-zero or negative scrub radius is desired, that can only be achieved at the expense of desirable kingpin axis inclination, and vice versa. The subject of kingpin inclination put aside, state of the art solutions to near-zero or negative scrub radius lead to other fundamentally negative side effects.

To name but two, these are a definite lack of wheel bearing robustness for a given hub package size, and a lack of provision for periodic wheel bearing preload adjustment in the course of routine maintenance. A further undesirable side effect is that the planes defining the inboard and outboard rows of rolling elements are very closely coupled to one another, and as wear develops over the bearing's life span, it magnifies the road wheel's free play in directions being oblique to the rotational-plane.

It follows then that there is a need for a relatively short hub supported by robust wheel bearings, which two characteristics of course are mutually exclusive with state-of-the-art solutions, so long as the CV joint's outer race proper at the wheel end of the drive shaft is not being integrated to the inboard wheel bearing.

SUMMARY OF THE INVENTION

It is an object of the present invention to provide a robust wheel support assembly for a wheeled vehicle wherein the CV joint's flexural center, that is to say its outer race proper, is placed more closely to the wheel center plane than is possible with current state of the art solutions, and by taking the opportunity thus offered in the present solution, introduce increased axial spacing between the inboard and outboard wheel bearings, and therewith provide full end support to said CV joint's outer race proper, yielding an assembly wherein wheel bearing preload is infinitely adjustable and can be regulated during routine maintenance.

The objective is achieved by assembling into the suspension upright a concentric interconnected arrangement comprising a wheel hub, two independent rows of axially adjustable wheel bearings being suitable for supporting combined axial and radial loads, one inboard and the other outboard relative to one another, each one of said bearings having a plurality of rolling elements, and a CV joint including an outer race having an integral coaxial outwardly extending stub axle with form fitting means of interconnecting mechanism thereon and further, said stub axle is having a concentric radially oriented surface formed on that part which is substantially its outer race proper, said concentric surface forming a raceway for being in bearing contact with said rolling elements of said inboard wheel bearing, wherein said raceway can be in the general area occupied by the driven plane, said driven plane being in line with said CV joint's said flexural center, and a form fitting means of interconnecting mechanism which enables the assembled parts to be connected as a preloaded unit in an adjustable and detachable manner. In the present invention, the inboard wheel bearing provides full end support to the CV joint's outer race proper, therewith inherently yielding increased axial distance between the inboard and outboard wheel bearings. Further, wheel bearing preload is adjustable at any time during the vehicle's service life.

For a given load bearing capacity, integrating the CV joint's outer race proper to the wheel bearing yields an axially short overall package, and presents several advantages, which are disclosed hereafter.

In the present invention, low kingpin inclination and negative scrub radius are simultaneously achievable, arising out of the short and robust package wherein the CV joint's outer race proper is positioned more closely to the wheel centerline than is possible with current practice by virtue of said CV joint's said outer race proper being combined with the inboard wheel bearing, such that it forms said bearing's inner race. A side benefit of this is added space for a longer length axle-driving half-shaft. Concurrently, due to increased axial space between the inboard and outboard wheel bearings as compared to the state of the art arrangements, a further advantage is the increased bending resistance offered by the hub when lateral loads are applied to the wheel, and increased bearing life owing to reduced bearing stresses resulting from enhanced mechanical advantages. Because there is full end support to the CV joint's outer race proper, reduced bending moments result from the application of driving torque in the presence of joint angularity in the CV joint's integral co-axially outwardly extending stub axle. A further advantage to be had by having two discreet bearing units instead of a single one is that a higher count of rolling elements can be installed for a still further increase in load capacity, and because of the added distance between the inboard and outboard bearings, when bearing wear is measurable the road wheel's free play in directions being oblique to the rotational-plane is less than is the case with closely coupled bearings. Yet another advantage is that the wheel bearings can be larger and/or of the tapered roller type, thus affording still higher load capacities. Additionally, a not inconsiderable benefit of this invention is that the wheel bearing preload is infinitely adjustable and can be regulated as a matter of routine maintenance.

According to one aspect of the invention, there is provided a interconnecting arrangement and bearing support for a vehicle axle hub in a suspension upright, comprising a CV joint including an outer race having an integral coaxial outwardly extending stub axle thereon, a flanged driven hub having a generally cylindrical main body, adjustable inboard and outboard wheel bearings each having a plurality of rolling elements, bearing seals, at least one lock washer and a form fitting interconnecting mechanism comprising an interconnecting member and one bearing preload adjusting member, wherein said adjusting member and the hub retaining member may be one and the same component, and wherein said hub, said CV joint, said adjustable inboard and outboard wheel bearings and said seals as well as said preload adjusting nuts are arranged on mutually coaxial axes, wherein said bearings and said seals are being fully seated within their respective counterbores in said upright, and wherein said CV joint's outer race proper and said hub are being centered and rotatably supported within said upright by said inboard and outboard wheel bearings respectively, said CV joint's said stub axle is being co-axially engaged into said hub and non-rotatably aligned relative thereto, said stub axle non-rotatably engaging said lock washer, and outboard of said lock washer said stub axle engaging said hub retaining member, said hub may have additional form fitting threads therein or thereon for receiving an additional adjusting nut thereto, and said hub flange is having provisions for mounting a road wheel thereto, the arrangement comprising an adjustable and detachable mechanism for rotatably mounting a road wheel into a suspension upright.

The adjustable inboard wheel bearing including an outer race member, a cage containing a plurality of rolling elements and an inner race member, is a full bearing, wherein said inner race member is said outer race proper of said CV joint having a concentric raceway thereon in the general area occupied by the driven plane in line with said CV joint's flexural center. The embodiment is achieved by providing an arrangement, wherein said cage and said rolling elements are being rotatably permanently affixed on to said inner race in a similar manner as they would be on to a conventional generic inner race, or in a first alternative said rolling elements and said cage are being rotatably permanently affixed to said bearing's said outer race member.

The adjustable outboard wheel bearing including an outer race member, a cage containing a plurality of rolling elements and an inner race member is a full bearing, wherein said inner race, is said generally cylindrical main body of said wheel hub having a concentric raceway thereon. The embodiment is achieved by providing an arrangement, wherein said cage and said rolling elements are being rotatably permanently affixed on to said inner race formed by said hub in a similar manner as they would be on to a conventional generic inner race, or in a first alternative said rolling elements in said cage are being rotatably permanently affixed to said bearing's said outer race member, or according to a further alternative by having a distinct full bearing seated co-axially on a journal seat suitably formed on said generally cylindrical main body of said hub, or in a further alternative, said rolling elements are being rotatably contained by said cage, wherein said cage containing said plurality of rolling elements is being a stand-alone component.

In one embodiment there is provided an arrangement wherein the CV joint's integral co-axially extending stub axle and the flanged hub non-rotatably engage one another in an axially adjustable manner forming a single interconnecting arrangement rotatably mounted in concentric inboard and outboard bearings, including respective outer races, respective cages having respective sets of a plurality of rolling elements therein and respective inner races, a suspension upright having a main bore cavity for ensconcing said interconnecting arrangement therein, and coaxial means of support formed by concentric counterbores at opposite ends of said main bore therein for said outer races of said inboard and outboard bearings facing one another for tensioning said pair of adjustable bearings confronting said means of bearing support therein, and said pair of adjustable and detachable wheel bearings locating and providing full end support at both ends to said rotating interconnecting arrangement in said upright.

In a preferred embodiment there is provided an arrangement wherein there is a CV joint having an integral co-axial stub axle having non-rotatable external form fitting interconnecting means with a reduced diameter threaded outwardly extending extension and a coaxial outer raceway radially formed on said CV joint's outer race proper in the general area occupied by the driven plane in line with said CV joint's flexural center, said CV joint's said outer race proper forming said inner race for said rolling elements of said adjustable inboard wheel bearing having an outer race and a bearing cage, said rolling elements rotatably being in bearing contact with said CV joint's said outer race proper, a co-axially mounted axially adjustable hub having non-rotatable internal form fitting interconnecting means and coaxial external raceway thereon and said hub on its face away from said CV joint having a counterbore with a reduced diameter threaded bore therein, said coaxial external raceway on said hub is being rotatably centered by said outboard wheel bearing's said rolling elements, and said counterbore and said threaded bore respectively being in bearing contact with and engaging a co-axially aligned bearing preload adjusting nut therein, a lock washer and a hub adjusting nut mating to said reduced diameter threaded outwardly extending extension on said CV joint's said stub axle, and an upright wherein the adjustable wheel bearings' said outer races are firmly seated.

In an alternate form of the previously described embodiment, the raceway formed on the hub for being in bearing contact with said outboard wheel bearing's said rolling elements is replaced by a coaxial journal seat having a raised co-axial shoulder at its outboard end for providing axial support to said outboard wheel bearing, and having a distinct generic inner race of said outboard wheel bearing seated thereon and confronting said shoulder thereof.

In a still further alternate form, said hub may have said bearing preload adjusting nut and said lock washer transposed to the exterior surface of said hub's said main body, wherein said adjusting nut and said lock washer are being located on a raised concentric threaded shoulder outboard of said raised coaxial journal seat provided for supporting said outboard adjustable wheel bearing's said distinct generic inner race.

The last three configurations just described have an advantage in that said hub retaining member can be fully tightened, thus causing the hub to confront said CV joint's outer race with a force which is independent of bearing preload.

Yet another hub configuration may be devised, wherein the bearing preload adjustment is achieved in much the same manner as is the case with a conventional non-driven wheel. In that case, that bearing preload adjusting nut which is threadedly associated with said hub is omitted, and thus any desired degree of adjustment is brought about by tightening to a predetermined preload value that hub retaining member which is threadedly associated with said CV joint's said stub axle, and having said hub retaining member restrained from further turning by a suitable means of locking arrangement.

Preferably, the CV joint's outer race proper and the concentric outwardly extending stub axle thereof are made as a homogenous entity.

According to an alternate concept, the concentric stub axle extending outwardly from the CV joint's outer race proper may be a mechanically integrated discrete segment thereof, so as to permit cost efficient use of mutually exclusive alloys for said axle and said outer race proper, wherein said outer race proper made of rolling contact bearing steel is being provided with a concentric cylindrical bore originating on the outboard planar surface thereof and terminating at the inboard planar surface being within the cage cavity therein, and wherein said stub axle being made of induction hardenable or case-hardenable steel is being provided with an inwardly extending concentric annular root, said root originating at the planar inboard end of said stub axle forming a raised shoulder thereof, wherein said root is provided with a first set of radially disposed axially oriented pointed teeth thereon and a cylindrical counterbore therein. At the time of inseparably joining said stub axle to said CV joint's outer race proper, as said root is being axially forced into said bore of said outer race proper until said root's said shoulder confronts the outer race's said outboard planar surface, the previously hardened said first set of teeth displace material from said outer race's said bore towards the cage cavity, forming a second set of teeth therein, and causing a portion of said root protruding into said cage cavity therein. The joining operation is completed by outwardly deforming said root's said protruding portion, thus forming a collar resting on said inboard planar surface therein, creating an inseparable assembly thereof.

While the concentric interconnected arrangement of said wheel support assembly may be laid out in any number of ways, in all cases the raceway on said CV joint's outer race proper is being in bearing contact with the plurality of rolling elements of the inner wheel bearing, and wherein said raceway is in the general area occupied by said CV joint's driven plane.

BRIEF DESCRIPTION OF THE DRAWINGS

Having thus generally described the invention, reference will be made to the accompanying drawings illustrating embodiments thereof, in which.

DESCRIPTION OF THE PREFERRED EMBODIMENTS

Figure 1:
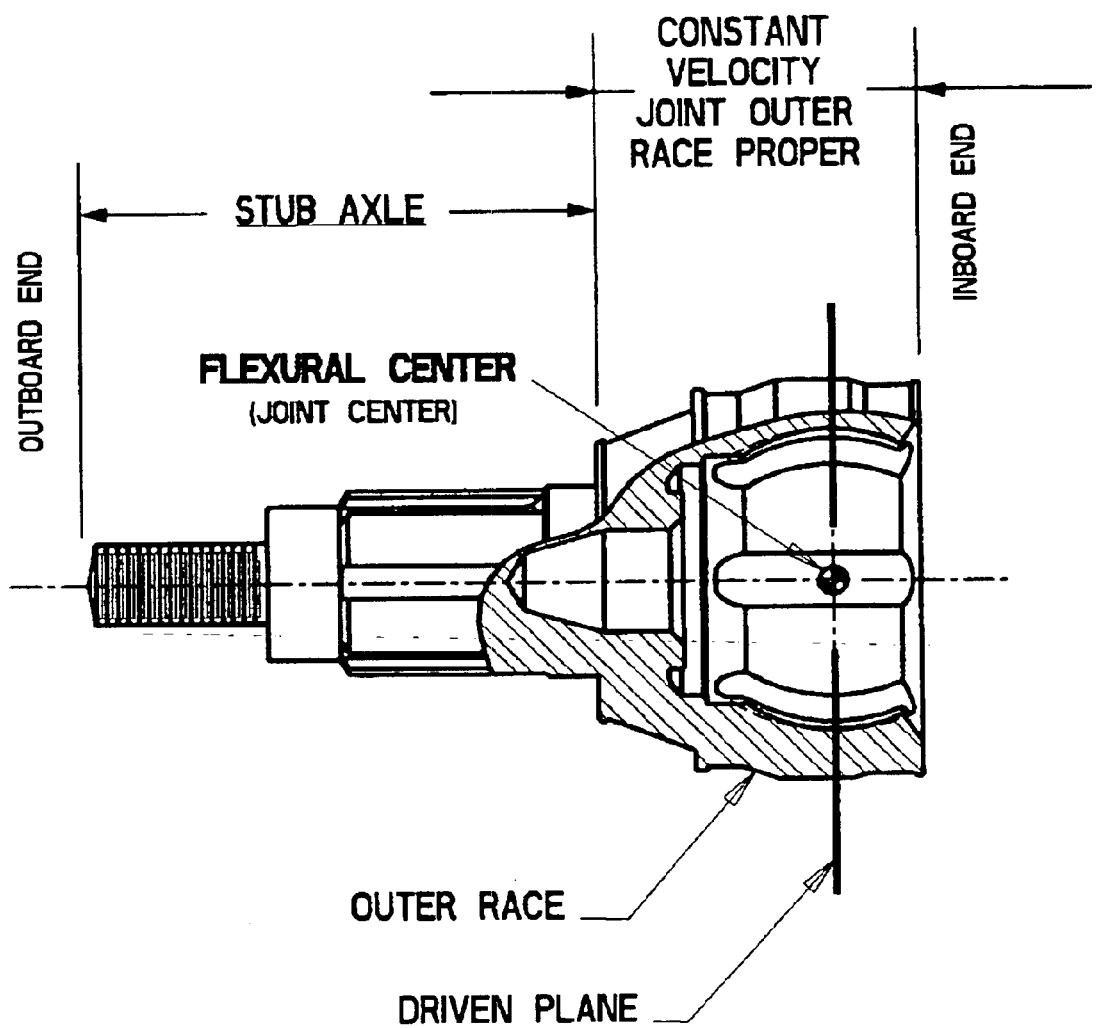
FIG. 1 is a side view with a broken out section of the CV joint outer race, noting commonly used terminology occurring throughout this document.

Referring to the drawings in greater detail and by reference characters thereto, in FIG. 1 there is illustrated a side elevation with broken out sectional view of the CV joint's outer race, noting the terminology referring to elements thereof and occurring throughout this document.

Figure 2:
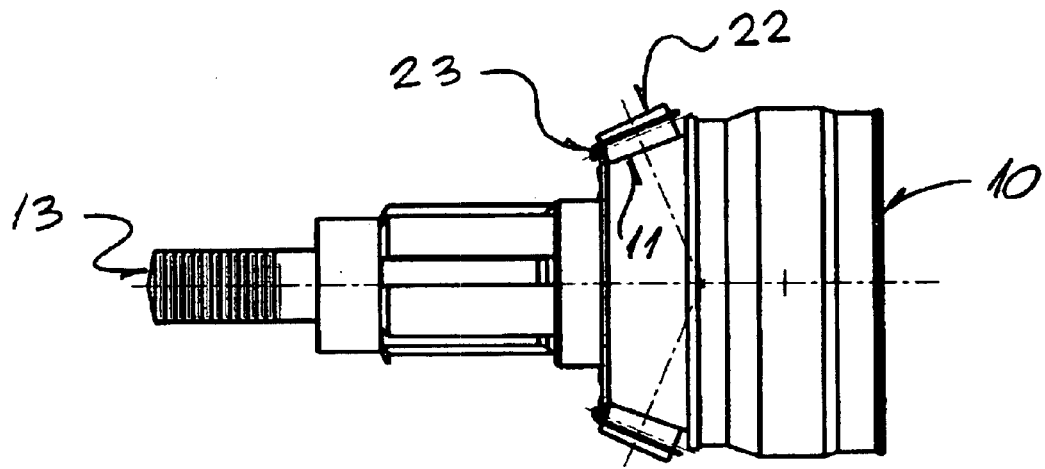
FIG. 2 is a side view of an arrangement of the inboard wheel bearing.

Referring to the drawing in FIG. 2, there is illustrated in side elevation an inboard bearing subassembly which includes a CV joint outer race proper 10 and a concentric laterally outwardly extending stub shaft 13, said outer race is configured to include a conical raceway 11 for being in bearing contact with a plurality of rolling elements 22, said rolling elements being retained thereto by spacer cage 23.

Figure 3:
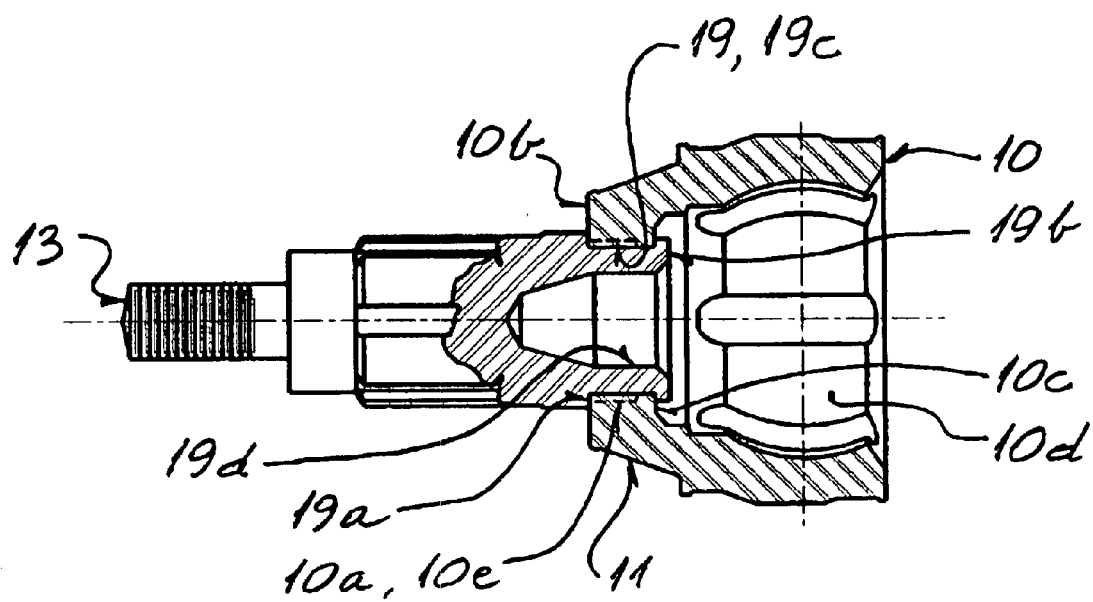
FIG. 3 is a side view with a broken out section of one arrangement of the CV joint outer race.

Referring to the drawing in FIG. 3, there is illustrated a side elevation with broken out sectional view a subassembly comprising the CV joint's outer race proper 10 and a concentric mechanically integrated discrete stub axle 13 extending outwardly therefrom.

CV joint's outer race proper 10, made of rolling contact bearing steel, is provided with a concentric cylindrical bore 10a originating on the outboard planar surface 10b thereof and terminating at the inboard planar surface 10c being within the cage cavity 10d therein.

Stub axle 13, being made of induction hardenable or case-hardenable steel, is provided with an inwardly extending concentric annular root 19, said root originating at the planar inboard end of stub axle 13 forming a raised shoulder 19a thereof, wherein said root 19 is being provided with a first set of radially disposed axially oriented pointed teeth 19c thereon, and a cylindrical counterbore 19d therein.

At the time of inseparably joining said stub axle to said CV joint outer race proper, the previously hardened teeth 19c of stub axle's said root 19 are being axially forced into the bore 10a of said outer race proper, said first set of teeth 19c displace material from said outer race's said bore 10a towards the cage cavity 10d, forming a second set of teeth 10e therein, a portion of said root 19 protruding into said cage cavity 10d therein. The uniting force is maintained until shoulder 19a of said root confronts the outer race's said planar surface 10b. The joining operation is completed by outwardly deforming said root's said protruding portion 19 causing the creation of a collar 19b resting on said inboard planar surface 10c therein, creating an inseparable assembly thereof.

Figure 4:
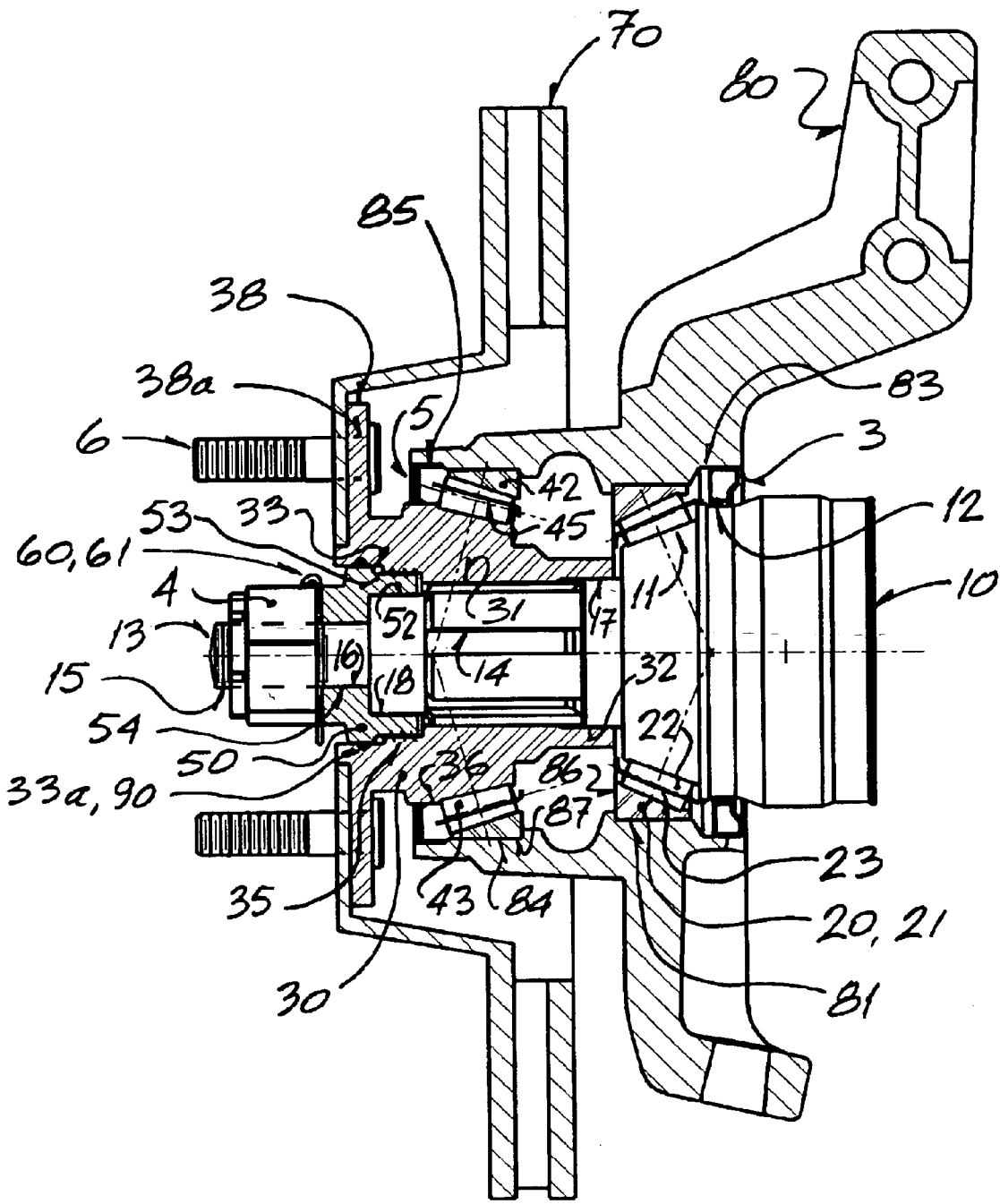
FIG. 4 is a cutaway view of one embodiment of an interconnecting arrangement for a vehicle axle drive shaft support and axle drive mechanism.

Referring to the drawing in FIG. 4, there is illustrated in sectional view a wheel hub and axle drive mechanism which includes an inboard wheel bearing subassembly comprised of a CV joint outer race 10 and a plurality of rolling elements 22 retained thereto by spacer cage 23, an inboard wheel bearing outer race 21, an inboard bearing seal 3, an outboard wheel bearing comprised of a wheel hub 30 and a plurality of rolling elements 43 retained thereto by spacer cage 45, an outboard wheel bearing outer race 42, a hub retaining lock nut 4, a bearing preload adjusting nut 50, a keyed lock washer 60, an outboard bearing seal 5, a brake disc 70, and finally wheel mounting threaded lugs 6 and suspension upright generally designated by reference numeral 80.

The CV joint outer race 10 is configured to include a conical raceway 11 for being in bearing contact with rolling elements 22 being retained thereto by spacer cage 23, a machined journal 12 for bearing seal 3, an integral coaxial outwardly extending axle 13 with external splines 14 to mate with internal splines 31 of hub 30, a raised coaxial journal seat 17 for supporting journal surface 32 of hub 30, a stepped down coaxial journal seat 18 for rotatably supporting internal coaxial bore 52 of adjusting nut 50, a further stepped down coaxial journal seat 16 for rotatably supporting internal coaxial bore 54 of adjusting nut 50, and a still further stepped down extension 15 is having an axially oriented keyway thereon to mate with lock washer 60 and threaded to engage matching threads of hub nut 4.

Inboard adjustable rolling element wheel bearing subassembly comprising CV joint outer race 10, rolling elements 22 and spacer cage 23, includes the outer race 21 to be seated firmly in the counterbore 81 and be confronting internal shoulder 86 of upright 80.

Outboard adjustable rolling element wheel bearing subassembly comprising hub 30, rolling elements 43 and spacer cage 45, includes outer the race 42 seated firmly in the counterbore 84 and confronting shoulder 87 of upright 80.

Inboard and outboard bearing seals 3 and 5 are in counterbores 83 and 85 respectively in suspension upright 80 prior to insertion of outer race of said CV joint 10 into said inboard bearing 20 in said upright, and prior to sliding hub 30 onto coaxial outwardly extending axle 13 of said CV joint outer race.

Hub 30 includes internal splines 31 in its bore to mate with matching external splines 14 on the coaxial outwardly extending stub axle 13, said hub having coaxial journal seats 32 and 33 for mating with corresponding journal surface 17 of axle 13, and with journal surface 52 of adjusting nut 50 respectively, a first raised journal seat 37 for radially supporting inner race 41 of the outboard adjustable wheel bearing 40, a shoulder 39 confronting face 44 of said inner race, a coaxially threaded bore 35 mating with threaded shank 53 of adjusting nut 50, and a second raised coaxial journal seat 36 for coming into contact with outboard bearing seal 5, and finally a hub flange 38 is provided with bolt holes 38a thereon for securing the threaded wheel mounting lugs 6 therein. Hub 30 is held securely in position on the CV joint's coaxial outwardly extending axle 13 by said wheel bearing adjusting nut 50, keyed lock washer 60 and said hub lock nut 4 being threaded onto coaxial stepped down extension 15 of said CV joint's said outer race.

Threaded shank 53 of said wheel bearing preload adjusting nut 50 is being engaged into the threaded bore 35 of hub 30, raised journal surface 55 of said adjusting nut is ensconced within said hubs counterbore 33, wherein there is formed an annular groove 33a for receiving O-ring 90 of rubber-like material thereto, said stub axle's journal surface 18 is in full contact with said hub's counterbore 52, and counterbore 54 is in full contact with journal 16 of said coaxial outwardly extending integral axle.

Keyed lock washer 60 is positioned between said wheel bearing preload adjusting nut 50 and hub retaining nut 4, and said adjusting nut is prevented from post adjustment rotation by having any suitable bend tab 61 of keyed lock washer 60 bent onto any suitable flat of said hub retaining nut.

Figure 5:
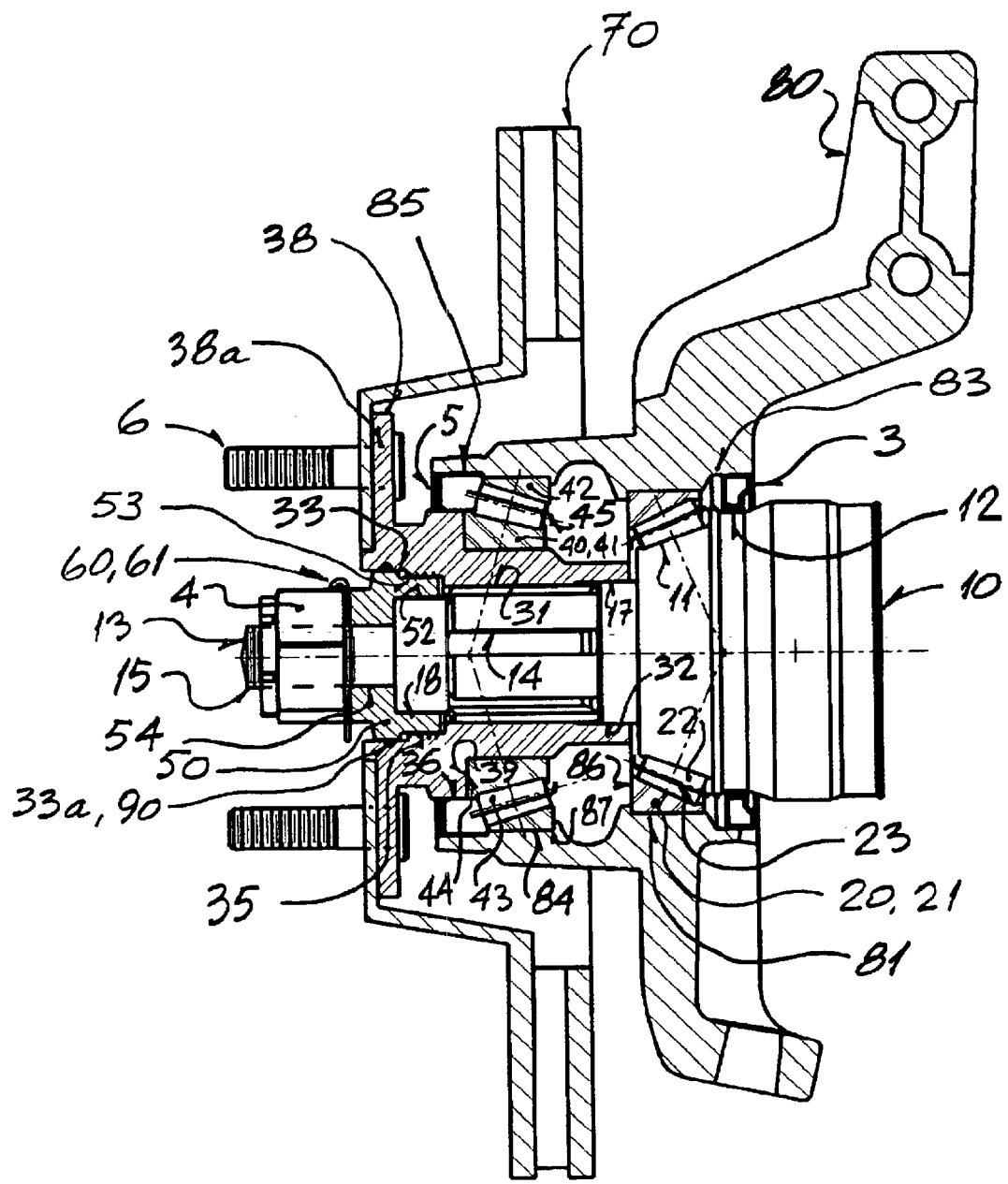
FIG. 5 is a modified view of the embodiment shown in FIG. 4, wherein the outboard wheel bearing inner race is a separate generic type.

A further embodiment is illustrated in FIG. 5, a modified version of the preferred configuration; the same reference numerals are used for identical components.

Referring to the drawing of the modified version of the preferred embodiment, the concept shown is essentially the same as that of the preferred embodiment, the exception being in the details of the outboard wheel bearing arrangement, wherein said bearing's inner race is not configured to make use of hub 30, but rather said hub includes a coaxial journal seat 32 which is suitable for radially supporting the generic type of inner race 41 of outboard adjustable rolling element wheel bearing 40. In all other respects, this concept is identical to the one shown in FIG. 4.

Figure 6:
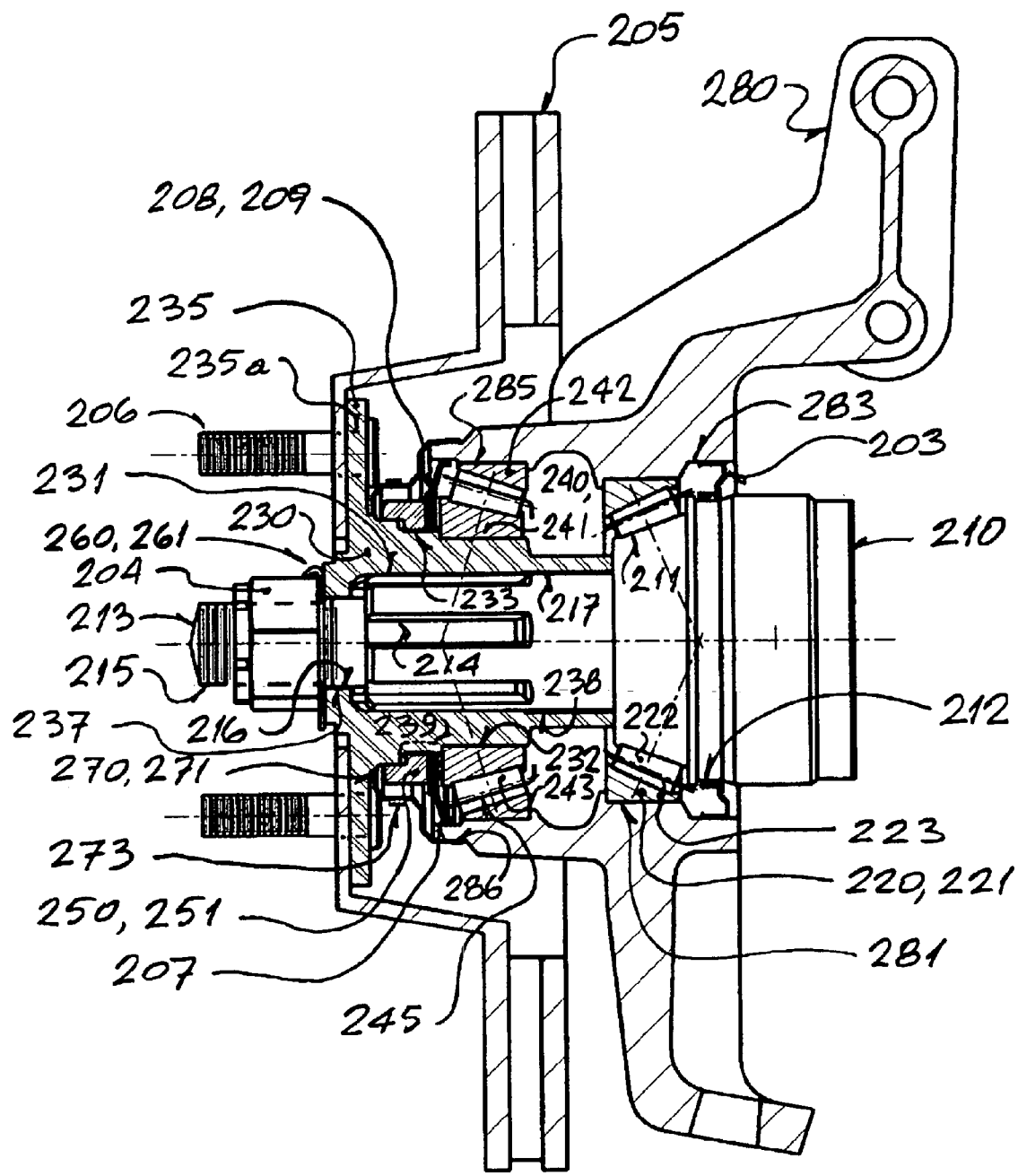
FIG. 6 is a cutaway view of a first alternate embodiment of an interconnecting arrangement for a vehicle axle drive shaft support and axle drive mechanism.

A further embodiment is illustrated in FIG. 6; similar reference numerals in the 200's are used for similar components.

Referring to the drawing of the first alternate configuration and by reference numerals in the 200's thereto, in FIG. 6 there is illustrated in sectional view a wheel hub and axle drive arrangement which includes a CV joint outer race 210, a inboard adjustable rolling element wheel bearing generally designated by reference numeral 220, a inboard bearing seal 203, a wheel hub 230, a hub retaining lock nut 204, a outboard adjustable rolling element wheel bearing 240, a bearing preload adjusting nut 250, a first keyed lock washer 260, a grease retainer 207, a second keyed lock washer 208 with bend tabs 209, a outboard bearing seal 270, wheel mounting threaded lugs 206, a brake disc 205, and finally a suspension upright generally designated by reference numeral 280.

CV joint outer race 210 is configured to include a conical raceway 211 for mating with rolling elements 222 of adjustable partial wheel bearing 220, a machined journal 212 for making contact with bearing seal 203, an integral coaxial outwardly extending axle 213 with external splines 214 to mate with internal splines 231 of hub 230, raised co-axial journal seats 216 and 217 for supporting journal surfaces 237 and 238 respectively of said hub, and a further stepped down extension 215 keyed to receive first lock washer 260 and threaded to mate with hub retaining nut 204.

Inboard adjustable rolling element wheel bearing subassembly comprising CV joint outer race 210, rolling elements 222 and spacer cage 223, includes the outer race 221 to be seated firmly in the counterbore 281 and be confronting internal shoulder 286 of upright 280.

Hub 230 includes internal splines 231 in its bore to mate to matching external splines 214 of CV joint's coaxial outwardly extending axle 213, a coaxial journal seat 232 which is suitable for radially supporting inner race 241 of outboard adjustable rolling element wheel bearing 240, a coaxial threaded raised shoulder 233 for engaging wheel bearing preload adjusting nut 250 is provided with any number of keyways 239 for mating to second keyed lock washer 208 and with keyed grease retainer 207, and finally hub flange 235 is provided with bolt holes 235a thereon for securing the threaded lugs 206 into. Hub 230 is held in a desired preloaded condition on said CV joint's coaxial outwardly extending axle 213 by hub retaining lock nut 204 engaged to coaxial threaded extension 215 of said CV joint.

Outboard adjustable rolling element wheel bearing 240 of the complete type is provided with an inner race 241 for fitting onto hub journal seat 232, an outer race 242 seated firmly into counter bore 285 of upright 280, and finally rolling elements 243 and cage; cage is not shown.

Wheel bearing preload adjusting nut 250 is turned onto threaded shoulder 233 of hub 230, positioning second keyed lock washer 208 and grease retainer 207 between itself and inner race 241 of said outboard adjustable wheel bearing 240. Bearing preload adjusting nut 250 is prevented from post adjustment rotation by having any suitable bend tab 209 of lock washer 208 bent into any suitable notch 251 of said adjusting nut 250.

Inboard bearing seal 203 is positioned in counterbore 283 in suspension upright 280 prior to insertion of outer race of said CV joint 210 into said inboard bearing 220 into said upright, and prior to sliding hub 230 onto coaxial outwardly extending axle 213 of said CV joint outer race.

Grease retainer 207 is positioned between lock washer 208 and inner race 241 of adjustable wheel bearing 240, while the outboard bearing seal 270 is of a three-element design, such that the two halves of the split element 271 are positioned on the front rim 286 of suspension upright 280 prior to positioning hub 230 onto coaxial outwardly extending axle 213 of said CV joint, and retaining clamp 273 of bearing seal 270 is fitted around said split element 271 after torquing down wheel bearing preload adjusting nut 250, and folding a suitable bend tab 209 of second lock washer 208 into any one of a series of radially oriented notches 251 of said adjusting nut.

Figure 7:
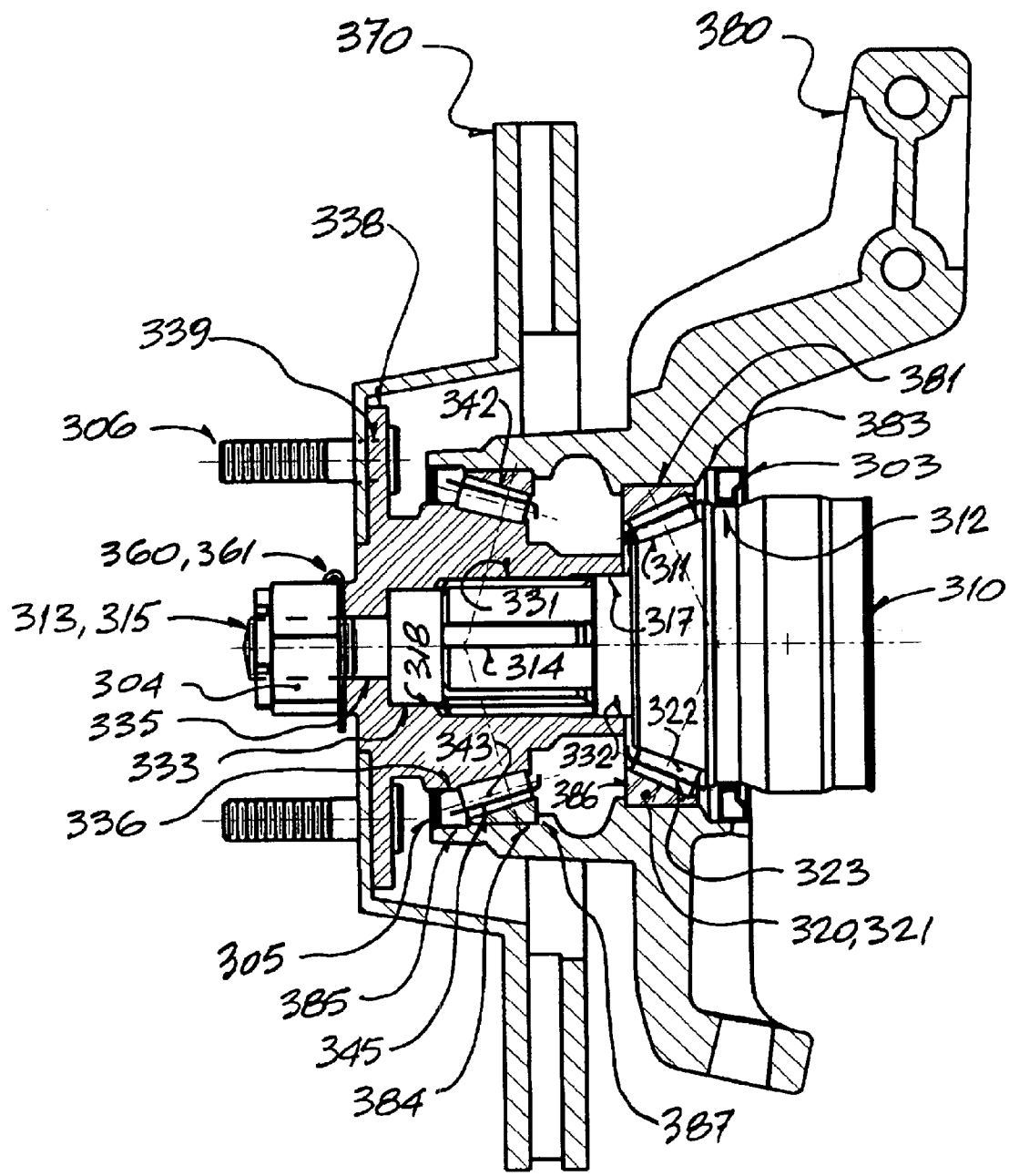
FIG. 7 is a cutaway view of a second alternate embodiment of an interconnecting arrangement for a vehicle axle drive shaft support and axle drive mechanism.

A further embodiment, a second alternate configuration is illustrated in FIG. 7; similar reference numerals in the 300's are used for similar components.

Referring to the drawing of the second alternate configuration and by reference numerals in the 300's thereto, in FIG. 7 there is illustrated in sectional view a wheel hub and axle drive mechanism which includes a CV joint outer race 310, an inboard adjustable rolling element wheel bearing generally designated by reference numeral 320, an inboard bearing seal 303, a wheel hub 330, a hub retaining nut 304, a outboard adjustable rolling element wheel bearing 340, an outboard bearing seal 305, a brake disc 370, and finally wheel mounting threaded lugs 306 and suspension upright generally designated by reference numeral 380.

The CV joint outer race 310 is configured to include a conical raceway 311 for being in bearing contact with rolling elements 322 being retained thereto by spacer cage 323, a machined journal 312 for bearing seal 303, an integral coaxial outwardly extending axle 313 with external splines 314 to mate with internal splines 331 of hub 330, a raised coaxial journal seat 317 for supporting journal surface 332 of hub 330, and stepped down coaxial journal seats 317 and 318 for supporting internal coaxial bores 332 and 333 respectively, a further stepped down extension 315 is having an axially oriented keyway thereon to mate with keyed lock washer 360, and said extension is threaded to engage matching threads of hub retaining nut 304.

Inboard adjustable rolling element wheel bearing subassembly comprising CV joint outer race 310, rolling elements 322 and spacer cage 323, includes the outer race 321 to be seated firmly in the counterbore 381 and be confronting internal shoulder 386 of upright 380.

Outboard adjustable rolling element wheel bearing 340 of the complete type is provided with inner race 341 for fitting firmly onto hub journal seat 337 tightly up against hub shoulder 339, and outer race 342 seated firmly into counterbore 384 and tightly up against upright internal shoulder 387 of upright 380, and rolling elements 343 and cage; cage is not shown.

Inboard and outboard bearing seals 303 and 305 are positioned in counterbores 383 and 385 respectively in suspension upright 380 prior to insertion of outer race of said CV joint 310 into said inboard bearing 320 in said upright, and prior to sliding hub 330 onto coaxial outwardly extending axle 313 of said CV joint outer race.

Keyed lock washer 360 is positioned between said hub 330 and said bearing adjusting nut 304, and said adjusting nut is prevented from post adjustment rotation by having any suitable bend tab 361 of lock washer 360 bent onto any suitable feature of said preload adjusting nut.

Keyed lock washer 360 is positioned between said hub 330 and said bearing adjusting nut 304, and said adjusting nut is prevented from post adjustment rotation by having any suitable bend tab 361 of lock washer 360 bent onto any suitable feature of said preload adjusting nut.

Figure 8:
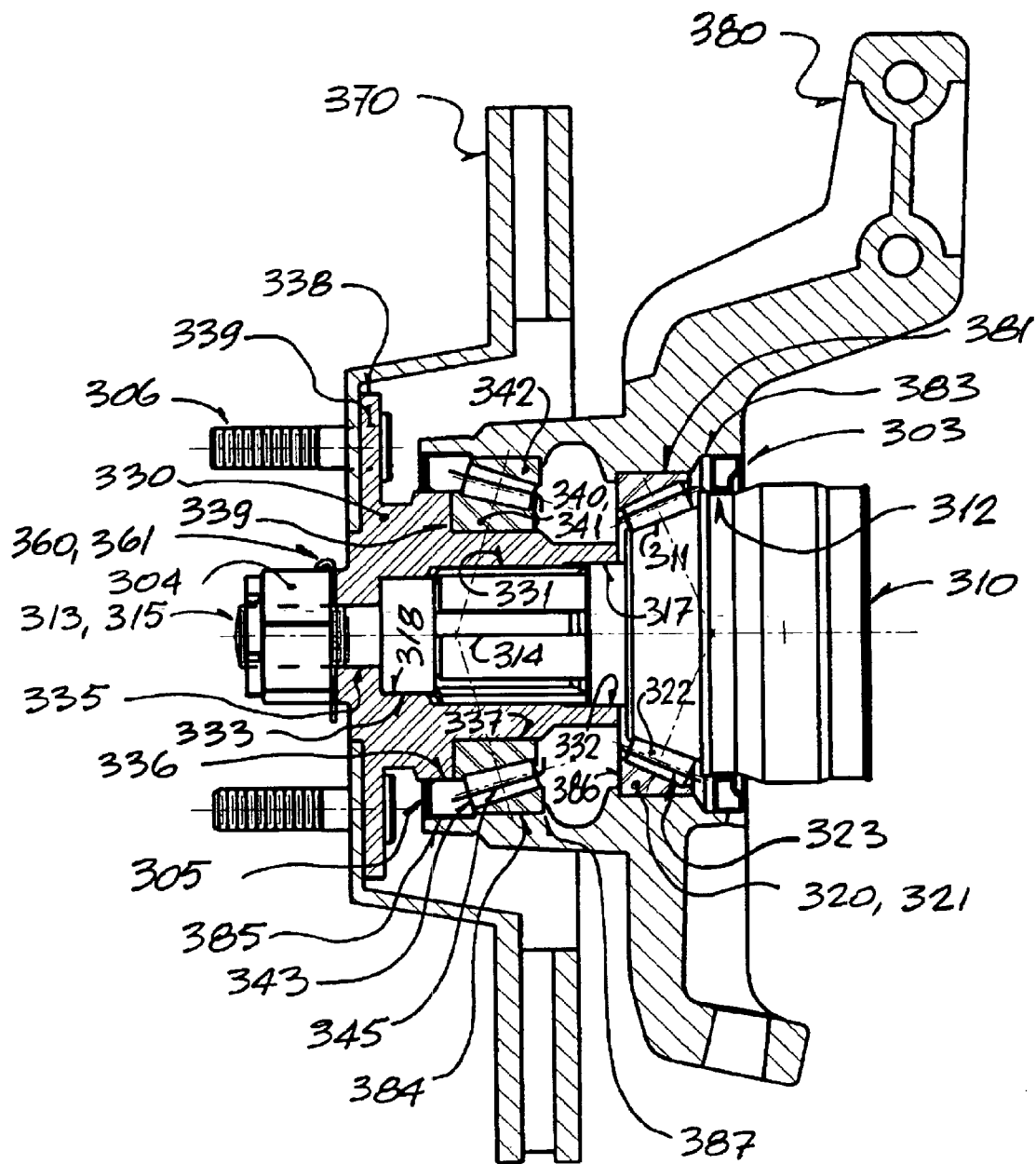
FIG. 8 is a modified view of the embodiment shown in FIG. 7, wherein the outboard wheel bearing inner race is a separate generic type.

A further embodiment is illustrated in FIG. 8, a modified version of the second alternate configuration; the same reference numerals are used for identical components.

Referring to the drawing of the modified version of the second alternate configuration and by the same reference numerals in the 300's thereto, the concept shown in FIG. 8 is essentially the same as that of the second alternate embodiment, the exception being in the details of the outboard wheel bearing arrangement, wherein said bearing's inner race is not configured to comprise hub 330, but rather said hub includes a coaxial journal seat 337 which is suitable for radially supporting the generic type of inner race 341 of outboard adjustable rolling element wheel bearing 340. In all other respects, this concept is identical to that shown in FIG. 7.

Figure 9:
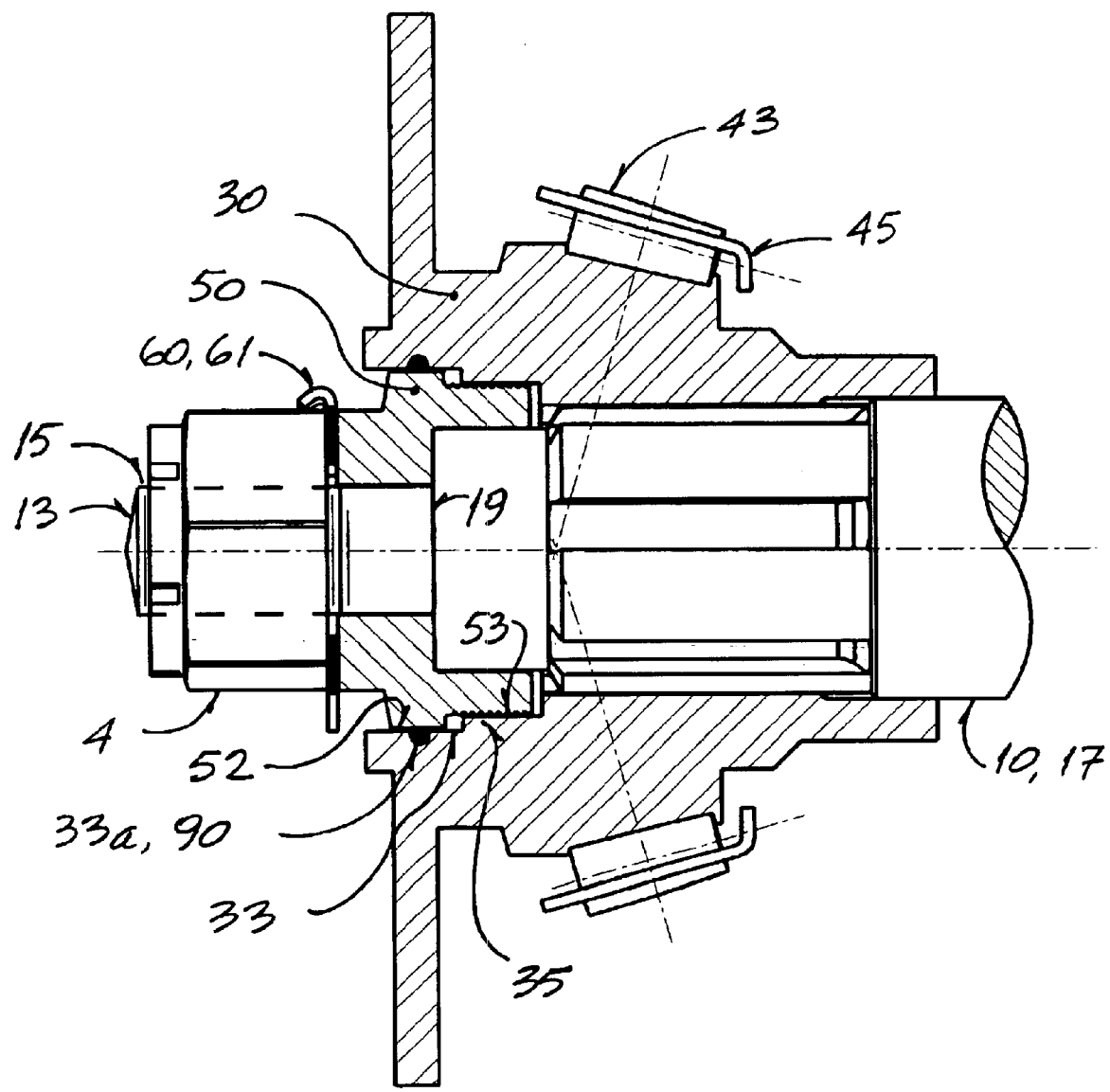
FIG. 9 is a cutaway detailed view showing the wheel bearing preload adjusting arrangement in the preferred embodiment.

The drawing in FIG. 9 is a detailed sectional view, showing the components for adjusting the wheel bearing preload in the preferred embodiment, wherein bearing preload adjusting nut 50 is engaged to threaded bore 35 of hub 30 by means of threaded shank 53, and having raised journal 55 being in full contact with said hub's counterbore 33, and wherein said adjusting nut is being held tightly against shoulder 19 of outwardly extending stub axle 13 of CV joint 10 by the retaining arrangement comprised of said wheel bearing adjusting nut 50, lock washer 60 and hub retaining nut 4, wherein said retaining nut is being threaded onto coaxial stepped down extension 15 of said outwardly extending stub axle.

Figure 10:
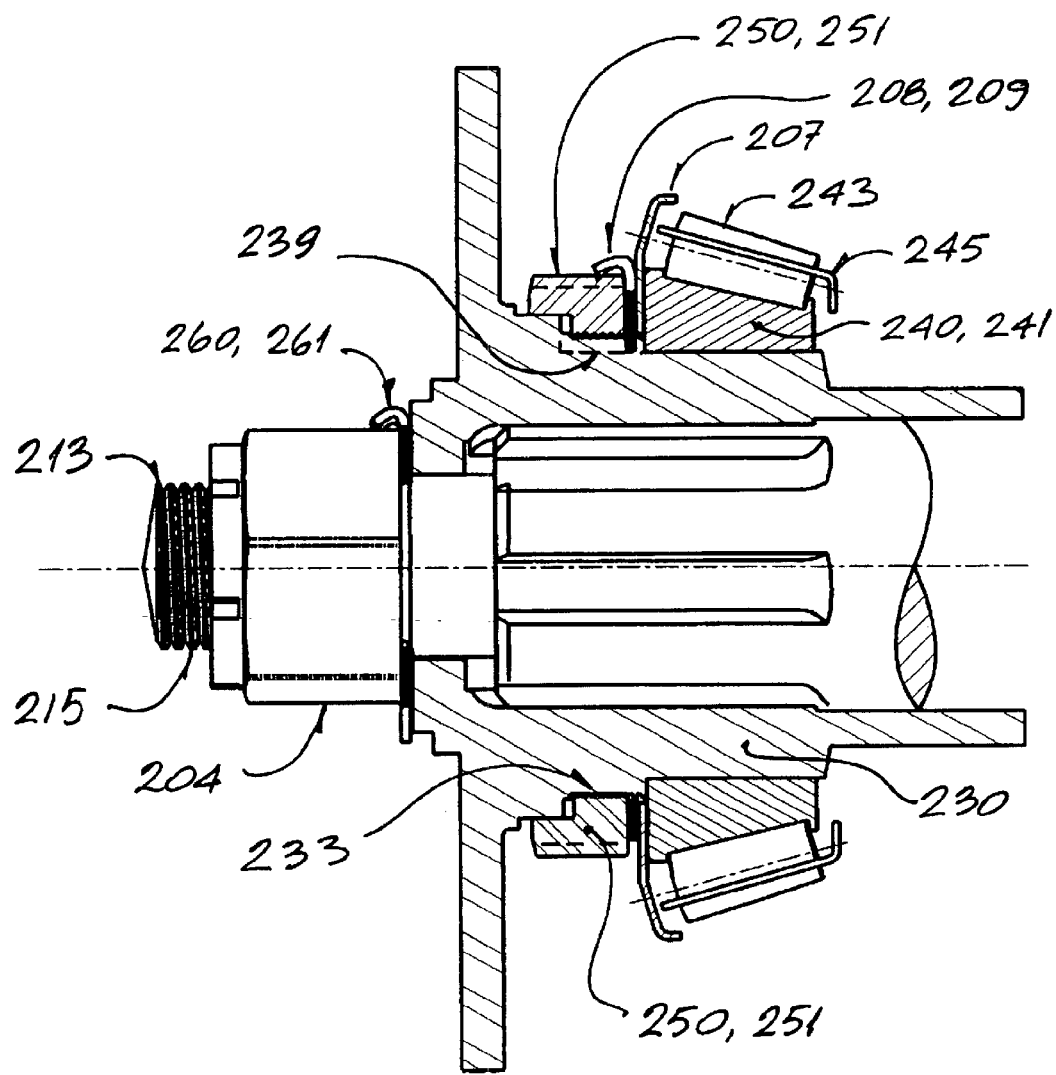
FIG. 10 is a cutaway detailed view showing the wheel bearing preload adjusting arrangement in the first alternate embodiment.

The drawing in FIG. 10 is a detailed sectional view, showing the components for adjusting the wheel bearing preload in the first alternate embodiment, wherein adjusting nut 250 is threaded onto shoulder 233, and second lock washer 208 and grease retainer 207 are placed between said adjusting nut and inner race 241 of adjustable bearing 240. In this design, hub 230 is being held tightly onto the outwardly extending axle 213 of CV joint 210, by first lock washer 260 and hub lock nut 204.

It will be understood that the above described embodiments are for purpose of illustration only and that changes and modifications may be made thereto without departing from the spirit and scope of the invention.

I claim:

1. An axially adjustable interconnected wheel bearing and constant velocity universal joint assembly comprising:

a hub for supporting a wheel, a constant velocity universal joint outer race member having a coaxial radially disposed conical surface on the outside thereof;

a stub axle having a splined coaxial connection with said hub, said stub axle having an inseparable mechanical connection with said constant velocity universal joint outer race member;

an inboard wheel bearing having an inner raceway and an outer raceway, wherein said conical surface is said inner raceway of said inboard wheel bearing and said conical surface is located approximately in the plane of said inseparable mechanical connection;

an outboard wheel bearing having a larger pitch circle diameter than a pitch circle diameter of said inboard wheel bearing, wherein said outboard wheel bearing is located on a coaxial outer surface of said hub, said inboard and outboard wheel bearings are in a preloaded tension state, a suspension upright part having a hub carrier cavity and a pair of concentric counterbores located at opposite ends of said hub carrier cavity, said counterbores define respective shoulders wherein said inboard and outboard wheel bearings disposed in their respective said counterbores abutting respective said shoulders within said hub carrier cavity, said hub and said constant velocity universal joint outer race member are being non-rotatably and axially freely engaged to one another, and said hub and said constant velocity universal joint outer race member rotatably supported by said inboard and outboard wheel bearings wherein said hub, said constant velocity universal joint outer race member, said stub axle and said inboard and outboard wheel bearings adjustably assembled in a preloaded tension condition.

* * * * *